United States Patent [19]

Yamaji et al.

[11] 4,230,595

[45] Oct. 28, 1980

[54] OXYGEN SCAVENGING AND HEAT-GENERATING COMPOSITIONS, AND DEOXYGENATING AND HEAT-GENERATING STRUCTURES

[75] Inventors: Teizo Yamaji, Yamaguchi; Hiroyuki Okitsu, Iwakuni, both of Japan

[73] Assignee: Teijin Limited, Osaka, Japan

[21] Appl. No.: 18,014

[22] Filed: Mar. 6, 1979

[30] Foreign Application Priority Data

| Mar. 13, 1978 | [JP] | Japan | 53/27601 |
| Mar. 16, 1978 | [JP] | Japan | 53/29217 |
| Jun. 7, 1978 | [JP] | Japan | 53/67747 |
| Aug. 3, 1978 | [JP] | Japan | 53/94092 |
| Aug. 7, 1978 | [JP] | Japan | 53/95363 |

[51] Int. Cl.$^2$ .............. C09K 5/00; C09K 15/02; A23D 3/34; A23D 5/04
[52] U.S. Cl. .............. 252/188; 252/188.3 R; 252/389 R; 252/400 R; 423/219; 426/262; 426/541
[58] Field of Search ............ 252/188, 188.3 R, 70, 252/408, 389 R, 400 R; 422/7; 423/269, 219; 424/147, 148; 426/262, 541

[56] References Cited

U.S. PATENT DOCUMENTS

| 2,513,602 | 7/1950 | Udy ...................... 252/188.3 R |
| 3,942,511 | 3/1976 | Black et al. ............ 252/188 |
| 3,993,577 | 11/1976 | Black et al. ............ 252/188.3 R |
| 4,073,861 | 2/1978 | Cilento et al. ......... 252/188 |
| 4,166,807 | 9/1979 | Komatsu et al. ........ 252/188 |

FOREIGN PATENT DOCUMENTS

| 47-121154 | 12/1972 | Japan . |
| 48-23730 | 3/1973 | Japan . |
| 48-88013 | 8/1973 | Japan . |
| 48-125487 | 11/1973 | Japan . |
| 48-143939 | 12/1973 | Japan . |
| 49-5613 | 1/1974 | Japan . |
| 49-22383 | 2/1974 | Japan . |
| 51-21982 | 3/1976 | Japan . |
| 51-21983 | 3/1976 | Japan . |
| 51-21984 | 3/1976 | Japan . |
| 51-35619 | 3/1976 | Japan . |
| 51-35620 | 3/1976 | Japan . |
| 51-147452 | 12/1976 | Japan . |
| 52-49885 | 5/1977 | Japan . |
| 52-66987 | 6/1977 | Japan . |
| 52-76636 | 6/1977 | Japan . |

*Primary Examiner*—Benjamin R. Padgett
*Assistant Examiner*—Irwin Gluck
*Attorney, Agent, or Firm*—Sherman & Shalloway

[57] ABSTRACT

An oxygen scavenger composition consisting essentially of
(a) metallic iron, and
(b) at least one oxidation promoter selected from the group consisting of sodium silicate hydrates, silicic acid, sodium alum and sodium borate hydrates, and optionally
(c) at least one oxidation promoter aid which is a metal halide compound, and/or
(d) a water-insoluble or sparingly water-soluble inert filler;

a heat-generating composition having an initial rate of oxygen scavenging of at least 5 ml per gram of said composition in the air at 20° C. during a period of one hour after the oxidation reaction was substantially begun, said composition consisting substantially of the metallic iron (a), a sodium silicate hydrate, and/or silicic acid as an oxidation promoter (b), the oxidation promoter aid (c) and optionally the filler (d);

a deoxygenating structure comprising the oxygen scavenger composition and a film having an oxygen permeability of at least 0.005 ml/cm$^2$.min.atm. (O$_2$ partial pressure) covering said composition; and a heat-generating structure comprising the heat-generating composition and a film having an oxygen permeability of 0.4 to 10 ml/cm$^2$.min.atm (O$_2$ partial pressure) covering said composition.

16 Claims, No Drawings

OXYGEN SCAVENGING AND HEAT-GENERATING COMPOSITIONS, AND DEOXYGENATING AND HEAT-GENERATING STRUCTURES

This invention relates to oxygen scavenging and heat-generating compositions, and to deoxygenating and heat-generating structures made by covering the aforesaid compositions with an oxygen-permeable film.

Many patent applications have been filed to date about oxygen scavenger compositions and heat-generating compositions which absorb oxygen.

For example, an oxygen scavenger composition comprising a transition metal of the 4th period, water and a sparingly water-soluble filler (Japanese Patent Publication No. 439/79), and an oxygen scavenger composition comprising a metal halide in addition to the aforesaid ingredients (Japanese Patent Publication No. 438/79) are known. These compositions contain free water, and generate hydrogen gas. However, no simple means for preventing the evolution of hydrogen gas is available, and it is dangerous.

As oxygen scavenger compositions not containing free water, there are known a composition comprising metallic iron, a metal halide as an optional ingredient, and sodium sulfate decahydrate (Japanese Patent Publication No. 440/79), a composition comprising the aforesaid metal ingredient or ingredients and sodium sulfite heptahydrate (Japanese Patent Publication No. 471/79), and a composition comprising the aforesaid metal ingredient or ingredients, and sodium carbonate decahydrate (Japanese Patent Publication No. 472/79).

These compositions are easier to handle than the first-mentioned compositions because they do not containing free water. However, since the water in the form of hydrate in these compositions greatly affects the oxygen scavenging property of the composition, the above compositions containing sodium sulfate decahydrate and sodium carbonate decahydrate do not easily exhibit the desired oxygen-scavenging property, and are difficult to handle. Sodium carbonate decahydrate decomposes at about 32° C. to 35° C., and fails to show the effect of sodium carbonate decahydrate. Since sodium sulfate decahydrate decomposes at about 32° C., it decomposes at a high ambient temperature or during storage, or as a result of the increase of the temperature by the heat of reaction caused by oxygen scavenging, resulting in a failure of exhibiting the effect of sodium sulfate decahydrate. Hence, the compositions containing these hydrates cannot withstand long-term storage.

The composition containing sodium sulfite heptahydrate is generally difficult to use because it evolves sulfur dioxide gas during storage or use.

Furthermore, the heat generated by these oxygen scavenger compositions is not enough for heating purposes.

On the other hand, a composition comprising metallic iron and metal chloride (Japanese Laid-Open Patent Publication No. 40477/75), a composition comprising metallic iron and iron sulfate (Japanese Laid-Open Patent Publication No. 112869/74), a composition comprising metallic iron, a metal chloride and activated carbon containing water (Japanese Laid-Open Patent Publication No. 105562/75), and a composition containing a compound of manganese, copper, chromium, etc. (Japanese Laid-Open Patent Publication No. 116380/75) are known as compositions which generate heat in the presence of water and oxygen.

A composition comprising metallic iron and a persulfate salt (Japanese Laid-Open Patent Publication No. 78943/74) and a composition comprising metallic iron and a sulfite salt (Japanese Laid-Open Patent Publication No. 75582/75) are known to generate heat in the presence of water.

The aforesaid compositions which generate heat in the presence of water and oxygen may or may not contain water therein. When water is not contained, moisture in the air is utilized as water required for the reaction. However, the moisture in the air cannot supply enough water for heat generation, and such compositions are not feasible as heat-generating compositions. The water-containing heat generating composition is not easy to handle as stated hereinabove with regard to the water-containing oxygen scavenger compositions. In addition, such compositions have the defect that the generation of heat is reduced or stopped when there is still enough metallic iron. Thus, these compositions pose problems of operation and performance which should be solved. For example, in actual use, it is necessary to mix the composition several times during use to make it uniform. Furthermore, some time is required until the several decreases of the amount of heat generated can be regained.

The same problems exist in the aforesaid compositions which generate heat in the presence of water.

It is an object of this invention therefore to provide an oxygen scavenger composition having superior oxygen scavenging ability which can be easily used and can scavenge oxygen smoothly.

Another object of this invention is to provide a heat-generating composition which as long as metallic iron participating substantially in oxygen scavenging is present therein, is maintained uniform in chemical composition, permits the oxidation reaction of the metallic iron to proceed smoothly, and generate heat in an amount sufficient for heating various objects.

Still another object of this invention is to provide a deoxygenating structure and a heat-generating structure which have the desired oxygen scavenging ability and heat-generating ability and can be used easily, said structures being made by covering the aforesaid oxygen scavenger composition and heat-generating composition, respectively, with a film having a moderate degree of oxygen permeability.

Still other objects of this invention will become apparent from the following description.

According to this invention, the objects and advantages of this invention are achieved by an oxygen scavenger composition consisting essentially of (a) metallic iron, and (b) at least one oxidation promoter selected from the group consisting of sodium silicate hydrates, silicic acid, sodium alum and sodium borate hydrates, and as optional ingredients, (c) at least one oxidation promoter aid which is a metal halide compound, and/or (d) a water-insoluble or sparingly water-soluble inert filler.

The work of the present inventors has shown that the oxidation reaction of (a) metallic iron proceeds smoothly in the presence of (b) the sodium silicate hydrate, silicic acid, sodium alum or sodium borate hydrate. Accordingly, the oxygen scavenger composition of this invention at least contains the components (a)

and (b), and (c) the metal halide and (d) the water-insoluble or sparingly water-soluble inert filler may optionally be included in the composition for smoothly and continuously performing the oxidation reaction of metallic iron. Other components are substantially unnecessary.

The oxygen scavenger composition of this invention, therefore, embraces the following four types of oxygen scavenger compositions.

(1) An oxygen scavenger composition consisting essentially of the metallic iron (a) and the oxidation promoter (b).

(2) An oxygen scavenger composition consisting essentially of the metallic iron (a), the oxidation promotor (b), and the oxidation promoter aid (c).

(3) An oxygen scavenger composition consisting essentially of the metallic iron (a), the oxidation promotor (b) and the filler (d).

(4) An oxygen scavenger composition consisting essentially of the metallic iron (a), the oxidation promotor (b), the oxidation promoter aid (c) and the filler (d).

The composition (1) forms the basis of the compositions of this invention. The oxidation promoter (b) serves to catalyze the oxidation reaction of the metallic iron (a), and also to enable the oxidation reaction to be performed effectively without interruption.

As compared with the composition (1), the composition (2) is characteristic in that it contains the oxidation promoter aid (c). This composition (2) is a better composition because the oxidation reaction of metallic iron (a) is generally activated to a greater degree, and proceeds more rapidly to a greater extent.

As compared with the composition (1), the composition (3) is characteristic in that it contains the water-insoluble or sparingly water-soluble inert filler (d). Generally, in the composition (3), the oxidation promoter (b) is dispersed uniformly throughout the composition by the effect of the filler so that it is easier to use in the reaction. Therefore, the reaction proceeds more smoothly. In addition to imparting such a property to the composition of this invention, the filler (d) imparts other superior properties for production or use such as the ease of handling or the controllability of oxygen scavenging by suitably selecting the type or content of the filler (d).

As compared with the composition (1), the composition (4) is characteristic in that it contains the oxidation promoter aid (c) and the filler (d) and generally has the properties of the compositions (2) and (3). However, since the components (b) and (c) in the composition of this invention may have the action of a filler, the composition (4) is not always superior in properties to the composition (2).

Of these types of the oxygen scavenger compositions of this invention, the compositions (2) and (4) have superior oxygen scavenging properties, and especially the composition (4) is preferred.

The components (a) to (d) which constitute the compositions of this invention will be described below.

In the present invention, metallic iron as component (a) is the only component which reacts with oxygen to combine chemically with it and to capture oxygen. Accordingly, the metallic iron (a) may, in principle, be any metallic iron, and needs not to be of high purity. For example, reduced iron, electrolytic iron, atomized iron, milled pulverized iron, and cast iron can be used favorably.

Desirably, such metallic iron is used in the form having a large surface in order to ensure good contact with the other constituents of the compositions of this invention. Preferably, therefore, it is usually employed as a sponge, fine granules or powder.

The fine granules or powder suitably have an average particle diameter of not more than about 1700 microns, preferably not more than 300 microns, especially preferably not more than 150 microns. However, the size and shape of the particles may vary according to the conditions, particle sizes, shapes or contents of the other ingredients.

The compositions of this invention contain preferably 5 to 90% by weight, especially preferably 10 to 90% by weight, of the metallic iron (a).

Generally, with decreasing content of the metallic iron (a), the total amount of oxygen captured by the composition per unit weight thereof decreases. However, the speed of oxygen capturing does not always show such a tendency. Furthermore, the total amount of oxygen captured per unit weight of the composition generally increases with increasing content of the metallic iron (a). In this case, too, the speed of capturing oxygen does not always increase correspondingly. Generally, the speed of capturing oxygen is regulated depending upon the types and proportions of the other ingredients in the composition other than the component (a).

The oxidation promoter as component (b) in this invention exhibits a catalytic action in the oxidation reaction of metallic iron. Hence, the compositions of this invention must contain the components (a) and (b) as essential components. The oxidation promoter (b) is selected from the group consisting of sodium silicate hydrates, silicic acid, sodium alum and sodium borate hydrates. Thus, one or more of these compounds may be used as the oxidation promoter (b). Among these, the sodium silicate hydrate, silicic acid, or a mixture of the sodium silicate hydrate and silicic acid are preferred. The sodium silicate hydrate, and a mixture of it with silicic acid are especially preferred.

Since the sodium silicate hydrates have a decomposition temperature of more than about 100° C., their function can be retained for an extended period of time, and this is one reason why the sodium silicate hydrates are preferred.

Various hydrates of sodium silicate can be used as the sodium silicate hydrates. Examples are $Na_2SiO_3.9H_2O$, $Na_2SiO_3.5H_2O$ and $Na_2SiO_3.4H_2O$. The sodium silicate hydrates used in this invention may be those containing an integral or fractional number of water molecules, and are not limited to the above examples. Among these, the nonahydrate and pentahydrate are preferred.

These sodium silicate hydrates are solid although they contain water of crystallization. These sodium silicate hydrates can be prepared by various methods, and any products can be used in this invention irrespective of the method of preparation. For example, they can be prepared by a method which comprises pulverizing and mixing silica sand and soda ash, placing the mixture in a melting furnace, heating it by a heavy oil or by electric power, taking it out when it is melted completely into a clear mass, cooling the mass to solidify it, pulverizing the solid product, dissolving the pulverized product with pressurized steam in an autoclave, allowing the resulting solution to stand thereby sedimenting the insoluble matter, filtering the supernatant liquid, and concentrating the filtrate; or by a method which comprises charging an autoclave with sodium hydroxide and an alkali-soluble siliceous material, introducing pressurized steam, filtering the reaction product to remove the insoluble matter, and concentrating the residue in a boiling kettle.

Both freshly prepared and commercially available sodium silicate hydrates can be used in this invention.

Suitable silicic acids that can be used in this invention are as follows:

(i) ortho-silicic acid $H_{2n+2}Si_nO_{3n+1}$
(ii) meta-silicic acid $H_{2n}Si_nO_{3n}$
(iii) meso-silicic acid $H_{2n-2}Si_nO_{3n-1}$
(iv) para-silicic acid $H_{2n-4}Si_nO_{3n-2}$ In the above formulae, n represents a positive number. Specific examples of such silicic acids are ortho-silicic acid such as $H_4SiO_4$, $H_6Si_2O_7$ and $H_8Si_3O_7$; meta-silicic acid such as $H_2SiO_3$, $2(H_2SiO_3)$ and $3(H_2SiO_3)$; meso-silicic acid such as $H_2Si_2O_5$ and $H_4Si_3O_8$; and parasilicic acid such as $H_2Si_3O_7$. However, the silicic acid (b) is not limited to these specific examples.

The silicic acids (b) are prepared by various methods which, however, do not affect the advantages of the compositions of this invention. For example, there can be obtained ortho-silicic acids such as $H_4SiO_4$, $H_6Si_2O_7$ and $H_6Si_2O_7.H_2O$, meta-silicic acid such as $H_2SiO_3$, and meso-silicic acid such as $H_2Si_2O_5$ produced by hydrolyzing ethyl ester of ortho-silicic acid with alcohol and water to form a white colloidal precipitate very gradually, and slowly dehydrating it with heating, or ortho-silicic acid, meta-silicic acid or meta-disilicic acid produced by causing an acid to act on an alkali silicate salt, and treating the resulting silica gel with various dehydrating-drying agents.

Among these, the ortho-silicic acids and meta-silicic acids are preferred.

Both freshly prepared and commercially available silicic acids can be used in this invention.

The sodium alum used in this invention has the composition $Na_2Al_2(SO_4)_4.24H_2O$. Potassium alum [$KAl(SO_4)_2.12H_2O$], which is a homolog of sodium alum, is not at all effective as component (b). Sodium alum is readily available commercially.

Various hydrates of sodium borate can be used as the sodium borate hydrates. Examples are $NaBO_2.4H_2O$, $Na_2B_4O_7.10H_2O$ and $NaBO_3.4H_2O$. The sodium borate hydrates used in this invention may also be those which contain a fractional number of water molecular, and are not limited to the above examples. Among these, $NaBO_2.4H_2O$ is preferred.

These sodium borate hydrates are solid although they contain water of crystallization. These sodium borate hydrates can be prepared by various methods, and any products can be used irrespective of the method of preparation.

For example, sodium tetraborate decahydrate ($Na_2B_4O_7.10H_2O$) is produced by a method which comprises leaching kernite ore by boiling in water, and followed by recrystallization; or by a method which comprises causing sodium carbonate to act directly on ulexite, colemanite or priceite, or neutralizing and crystallizing it after conversion to boric acid. Sodium meta-borate tetrahydrate ($NaBO_2.4H_2O$) is produced, for example, by heating a mixture of sodium carbonate and an equivalent weight of sodium tetraborate, dissolving the heated mixture in water, and recrystallizing it from hot water. Sodium perborate tetrahydrate ($Na_3BO_3.4H_2$)) is produced, for example, by the action of sodium hydroxide and hydrogen peroxide on an aqueous solution of sodium tetraborate; or by melting sodium peroxide with boric acid, and dissolving the melt in water.

Both freshly prepared and commercially available sodium borate hydrates can be used in this invention.

The composition of this invention contains preferably at least 3 parts by weight, especially preferably at least about 10 parts by weight, of the oxidation promoter (b), when it contains 5 to 90% by weight of the metallic iron (a).

Generally, when the content of the oxidation promoter (b) is increased in a composition composed of the metallic iron (a) and the oxidation promoter (b), the speed of oxidation which has increased as a result of the increase of the oxidation promoter is limited because the content of the metallic iron decreases.

The oxidation promoter aid (c) is one of the two components which may optionally be contained in the compositions of this invention. The oxidation promoter aid serves to strengthen the catalytic action of the oxidation promoter (b) which activates the reaction between metallic iron and oxygen.

The composition containing component (c) has the property of inducing the above reaction more rapidly and to a greater extent.

Metal halides compounds are used as the oxidation promoter aid (c) either singly or as a mixture of two or more of these compounds. Examples of the metal halide (c) are the chlorides, bromides and iodides of various metals such as alkali metals, alkaline earth metals, and transition metals. Specific examples of the metal halide compounds (c) include alkali metal or alkaline earth metal halides such as sodium chloride, potassium chloride, sodium bromide, potassium bromide, sodium iodide, magnesium chloride, calcium chloride, barium chloride, magnesium bromide, calcium bromide, barium bromide, zinc chloride and zinc bromide; transition metal halides such as copper chloride, copper bromide, silver chloride, silver bromide, tin chloride, ferrous chloride, ferric chloride, ferrous bromide, ferric bromide, cobalt chloride, nickel chloride, cobalt bromide, and nickel bromide; and aluminium chloride.

These metal halides can be used either in the form of anhydrous salts or hydrates. Of the above metal halides, the chlorides and bromides of alkali metal or alkaline earth metals are preferred, and sodium chloride, potassium chloride, magnesium chloride, sodium bromide, and potassium bromide are especially preferred.

The compositions of this invention contains the oxidation promoter aid (c) in an amount of preferably at least 3 parts by weight, especially preferably at least about 5 parts by weight, per 100 parts by weight of the metallic iron when the amount of the metallic iron (a) in the entire composition is 5 to 90% by weight.

The filler as component (d) in the present invention is one of the two components which the compositions of this invention may optionally contain. The filler act to impart various additional functions to the composition of this invention. The filler is a water-insoluble or sparingly water-soluble inert filler which is either an organic or inorganic solid. The "inertness", as used herein, denotes a chemical property of a filler whereby it does not substantially promote the oxidation of the metallic iron at room temperature in a mixture of the filler and the metallic iron (a).

Oxygen scavenger compositions of this invention containing such a filler generally have a faster speed of oxygen scavenging or a larger amount of oxygen scavenged than those compositions of this invention which do not contain the filler. The filler also serves to improve the gas permeability, heat insulation, and heat conduction of the compositions of this invention and to prevent their localized overheating. Binders and lubricants used in the molding of the compositions of this invention are also included within the definition of the filler in accordance with this invention.

Specific examples of the filler include carbonaceous materials such as charcoal, activated carbon and graphite; powders of metals such as aluminium, palladium, copper and titanium; metal carbides such as silicon carbide and iron carbide; metal nitrides such as silicon nitride; metal oxides such as zinc oxide, calcium oxide, titanium oxide, silica-zirconia, iron oxide, aluminium hydroxide, silica, alumina, silica-alumina, and silica-magnesia; metal salts such as magnesium sulfate, calcium sulfate, sodium sulfate and calcium carbonate; calcium silicate, glass powder, carbonized powder of unhusked rice, and stone powder; and organic fillers, for example synthetic resin powders such as cellulose, polystyrene or aromatic polyamide powder, wooden powder, and fiber scraps such as cotton scraps, polyester or polyacrylonitrile scraps.

Various grades of silica ($SiO_2$), alumina ($Al_2O_3$) and silica-alumina ($SiO_2.Al_2O_3$) can be used as the filler. For example, the alumina may be $\alpha$-, $\beta$-, or $\gamma$-alumina. The ratio of the silica unit to the alumina unit in the silica-alumina may vary over a wide range, for example, from 1:99 to 99:1. Silica-alumina having a silica unit:alumina unit weight ratio of from 5:95 to 95:5, especially from 10:90 to 90:10, is superior.

In addition to such synthetic silica-alumina, naturally occurring silica-containing, alumina-containing, or silica-alumina-containing minerals may be used equally as the silica-alumina in this invention. Examples of such minerals include silica-containing minerals such as silica rock, silica sand, powdery quartz and diatomaceous earth; alumina-containing minerals such as bauxite, alumina minerals [e.g., boehmite ($Al_2O_3.H_2O$), diaspore ($Al_2O_3.H_2O$) and gibbsite ($Al_2O_3.3H_2O$)], bayerite, aluminous shale, and clay; silica-alumina-containing minerals such as feldspar, "Kibushi" clay, bentonite (main ingredient $Al_2O_3.4SiO_2.nH_2O$), acid terra alba, active terra alba, agalmatolite (main ingredient pyrophillite $Al_2O_3.4SiO_2.H_2O$), sericite, pyrophyllite, mica (e.g., muscovite), nacrite, various zeolites such as aluminosilicates, montmorillonite, and molecular sives such as molecular sives 3A, 4A, 5A and 13X.

As the silica-magnesia, minerals containing a silica unit and a magnesia unit as main ingredients, and synthetic silica-magnesia are used. For example, the minerals are talc having hydrous magnesium silicate as a main ingredient, olivine, India mica, asbestos, serpentine, and magnesium meta-silicate can be cited. Usable synthetic silica-magnesias are those in which the weight ratio of the silica unit to the magnesia unit varies over a wide range, for example from 1:99 to 99:1, preferably from 95:5 to 5:95.

Binders such as starch, carboxymethyl cellulose, polyvinyl acetate, polyvinyl alcohol and polyethylene, and lubricants such as metal stearates (e.g. calcium stearate) are preferably used to improve moldability.

If desired, the filler (d) is used in the form of hydrate.

The compositions of this invention contain such a filler (d) in an amount of at least 3 parts by weight, preferably at least about 10 parts by weight, per 100 parts by weight of the metallic iron when it contains 5 to 90% by weight of the metallic iron (a).

Generally, with increasing content of the filler, and with decreasing content of the metallic iron (a), the amount of oxygen scavenged per unit weight of the composition tends to decrease. From this viewpoint, the use of too much filler is undesirable. In determining the amount of the filler, the fact that the aforesaid components (b) and (c) also act as a filler should also be taken into consideration. Since, however, the filler plays an important role of improving the gas-permeability and heat insulation of the composition of this invention and of preventing its localized overheating, it is sometimes necessary to use it in a relatively large amount with regard to the other ingredients.

As stated above, the composition of this invention may contain activated carbon. The activated carbon serves to improve heat insulation and gas-permeability. It has been found that activated carbon also gives an oxygen scavenging composition in accordance with this invention has an induction period during which the composition does not substantially begin oxygen scavenging even upon contact with oxygen.

For this reason, the composition of this invention containing activated carbon has the advantage that even when it is prepared by mixing the individual ingredients in the air over a relatively long period of time, the oxygen scavenging ability of the resulting composition is still maintained high because of the presence of the induction period. Consideration must, however, be given to the fact that in a composition containing too much activated carbon, the excessively long induction period becomes an undesirable property. Generally, the amount of activated carbon used as the filler is less than 15% by weight, preferably less than 10% by weight, based on the entire composition.

As stated hereinabove, the oxygen scavenger composition of this invention has a very good ability to scavenge oxygen, and is suitably used to provide an atmosphere which is free of oxygen or contains a markedly reduced amount of oxygen.

The oxygen scavenger composition of this invention includes those compositions which have a very high speed of oxygen scavenging and thus capture oxygen very rapidly within short periods of time, as specifically illustrated by many Examples to be given hereinbelow. It has been found that in such compositions, the heat of reaction generated incident to oxygen scavenging is in such an amount that is fully satisfactory for a material to be warmed or heated.

Thus, according to this invention, there is also provided a heat-generating composition which has a specified chemical composition within the range of the oxygen scavenger composition of this invention described hereinabove, and which captures at least 5 ml of oxygen per gram of the composition in the air at 20° C. during the period of one hour after the oxidation reaction has substantially begun. The heat-generating composition of this invention is characterized by performing rapid oxygen scavenging after the oxidation reaction has substantially begun. Preferably, the composition scavenges at least 10 ml of oxygen per gram of the composition in the air at 20° C. during the period of one hour after the oxidation reaction has substantially begun.

As described hereinabove with regard to the filler (d), the oxygen scavenger composition of this invention includes those which contain such a filler as active carbon. Some of these compositions do not gegin an oxidation reaction immediately upon contact with oxygen, but have an induction period during which the oxidation reaction does not substantially take place.

Such an induction period is defined in this invention as the period which lasts until the rate of reaction abruptly changes, as is shown, for example, in the time-conversion curve in a radical polymerization reaction.

The heat-generating composition of this invention having such heat-generating characteristics consists essentially of (a) metallic iron, (b) a sodium silicate hydrate and/or silicic acid as an oxidation promoter, (c) at least one metal halide compound as an oxidation promoter aid, and (d) optionally, a water-insoluble or sparingly water-soluble inert filler.

The heat-generating composition of this invention thus contains components (a), (b) and (c) as essential constituents, and optionally contains the filler (d).

These components (a) to (b) are the same as those of the oxygen scavenger compositions described hereinabove.

An especially preferred heat-generating composition of this invention consists of (a) 20 to 80% by weight of metallic iron, (b) 10 to 50% by weight of sodium metasilicate nonahydrate and meta-silicic acid, (c) 1 to 20% by weight of sodium chloride, and optionally (d) not more than 50% by weight of the filler.

The oxygen scavenger composition and heat-generating composition of this invention can be prepared, for example, as follows:

Generally, such compositions can be prepared easily by sufficiently mixing predetermined amounts of components (a) to (d) in powder form by a mechanical means, or by mechanically mixing them fully while pulverizing.

If the individual components are reduced to a powder prior to mixing, sufficient mixing can be effected within a relatively short period of time to give an intimately mixed composition in accordance with this invention. Generally, in a large-scale mixing operation, the mixing is preferably carried out such that the contact between the components (a) and (b) occurs in the last place. For example, it is desirable to fully mix the components (b) to (d) and then mix the mixture further with the component (a); or to first fully mix the components (a), (c) and (d), preferably the components (a) and (d), and then mix the mixture with the component (b), preferably the components (b) and (c). In the present invention, the components (a) to (d) have a particle diameter of not more than 1,750 microns, preferably not more than 300 microns, especially preferably not more than 150 microns. It is not particularly necessary however to equalize the particle diameters of all of the components.

Generally, the mixing operation, especially the mixing operation involving contact between the components (a) and (b), is desirably carried out in an oxygen-free atmosphere or an atmosphere containing a small amount of oxygen, for example, in an atmosphere of an inert gas such as nitrogen gas.

The mixing or the pulverizing-mixing operation is carried out, for example, by using a mortar, an agate mortar, a mixing and grinding machine, a ball mill, a gear compounder, an internal mixer, or a V-type mixer.

The resulting intimately mixed oxygen scavenger composition and heat-generating compositions of this invention can be molded, as required, into the desired configuration. A tableting machine, an extrusion-molding machine, a roll molding machine, etc. are used for the molding, and the product is obtained in a form suitable for the purpose of use, such as a pellet, bead, rod, block or sheet.

In the molding operation, the composition of this invention may be simply molded under pressure, or molded after adding a filler, for example a binder such as starch, carboxymethyl cellulose, polyvinyl acetate, polyolefins or polyvinyl alcohol, or a lubricant such as calcium stearate.

The oxygen scavenger composition and heat-generating composition of this invention so produced can be used as an as-prepared powder or as a molded article. It is convenient to use them in the packed state using an air-permeable packaging material such as cellophane and plastic films such as polyester films or paper. The material and structure of the packaging material can be varied depending upon the purpose of use so long as it is air-permeable. In this case, it is possible to cover at least one surface of the composition with the aforesaid air-permeable packaging material in a thin layer.

For example, the composition of this invention may be packed with a suitably perforated packaging material and further covered with an oxygen-impermeable packaging material. In use, upon removing the outer covering, the composition contacts oxygen in the open atmosphere and scavenges oxygen. In this way, the oxygen scavenger composition and heat-generating composition of this invention can be used easily and conveniently.

The work of the present inventors has led to the discovery that by covering the oxygen scavenger composition of this invention with a film having an oxygen permeability of at least 0.005 ml/cm$^2$.min.atm ($O_2$ partial pressure), preferably 0.01 to 20 ml/cm$^2$.min.atm ($O_2$ partial pressure), a form that is easy to use is imparted to the oxygen scavenger composition of this invention, or the oxygen scavenger composition of this invention is kept in a desirable condition capable of controlling the speed of oxygen scavenging. If the oxygen scavenger composition of this invention has the property of rapidly captures oxygen, a deoxygenating structure which captures oxygen relatively slowly can be formed by covering the composition with a film having a relatively low oxygen permeability. If the oxygen scavenger composition of this invention is coated with a film having a high oxygen permeability, a deoxygenating structure which rapidly captures oxygen can be built.

Generally, the aforesaid film used has an area of 0.2 to 100 cm$^2$ per gram of the oxygen scavenger composition.

Furthermore, the work of the present inventors has also shown that by covering the heat-generating composition of this invention with a film having an oxygen permeability of 0.4 to 10 ml/cm$^2$.min.atm ($O_2$ partial pressure), a form that is easy to use is imparted to the heat-generating composition of this invention, and the heat can be taken out from the heat-generating composition of this invention in an amount readily usable for the heating or warming of an object. When the covering film for the heat-generating composition has the above-specified oxygen permeability, a heat-generating structure in accordance with this invention can be made which can maintain a relatively easily utilizable temperature of, say, 60° C. or 80° C., for the desired period.

Generally, the above film used has an area of 0.2 to 100 cm$^2$, preferably 0.5 to 50 cm$^2$, per gram of the heat-generating composition.

The above deoxygenating structure and heat-generating structure of this invention have the excellent property of scavenging oxygen or generating heat over an extended period of time without particularly mixing the composition therein during use.

These structures of this invention may be the one in which the composition is covered entirely with the oxygen-permeable film; or it is covered partly with the aforesaid film and the other part, with an oxygen-impermeable material.

The desired oxygen-scavenging rate, heat-generating temperature, amount of heat generated and heat-generating period can be obtained by properly controlling the area ratio of the oxygen-permeable film to the oxygen-impermeable film.

The degree of air-permeability and the area of the film can be chosen depending upon the end use of the deoxygenating or heat-generating composition. For example, when a maximum of oxygen-scavenging speed or temperature is desired, the air-permeability of the covering material is substantially increased, and its area is broadened. When the heat-generating structure is to be used for warming the human body or a therapeutic pack, it is desirable to maintain the structure at a certain fixed temperature below 100° C. for long periods of time.

The oxygen-permeable material may be any material which does not permit leakage of the composition and has the aforesaid properties, and there is no particular restriction in regard to the type, thickness and shape of the material. The material may, for example, be variously perforated plastic films, papers, knitted or woven cloths, non-woven cloths, and open cellular polymeric films. Porous magnetic and glass materials having a definite shape can also be used. These materials may be produced from polymeric compounds such as polyethylene, polypropylene, nylons, polyesters, acetates, polyvinyl alcohol, cellophane, polymethyl methacrylate and acrylic resins, inorganic fibers such as carbon fibers, glass fibers and asbestos, and natural fibers such as cotton, silk and pulp. These materials may be used singly. Alternatively, two or more of these materials may be combined by suitable methods, for example, by contact bonding, sewing or melt-bonding. When they have other properties such as heat insulation, heat conduction, hand, touch, hygroscopicity and deodorizing in addition to air permeability, they can be used favorably according to the end uses.

The shape of the structures may be selected according to the end uses. For example, a sheet-like shape is usually selected for use in warming the human body. Furthermore, it can be used as a receptacle or bag molded into the desired shape or heating and warming objects having definite configurations, for example in the heating of bottled and canned foods, and heating of automobile batteries in the cold climate. To increase the efficiency of heating, a thermally insulative material may be provided on the marginal portion of the heat-generating structure and an object to be heated, the heat-generating structure may be used in intimate contact with the object to be heated, or the object to be heated may be interposed between the heat-generating structures.

The work of the present inventors also has also shown that by covering such as structure of this invention with a film having an oxygen permeability of not more than 50 ml/m$^2$.24 hr.atm. ($O_2$ partial pressure) and a moisture permeability of not more than 5 g/m$^2$.24 hr and sealing the film, the oxygen-scavenging and heat-generating ability of the composition contained therein can be maintained favorable. The reason for this is not entirely clear. It is presumed however that the composition of this invention sealed up by a film having the specified oxygen permeability and moisture permeability is kept well from contact with oxygen in the ambient atmosphere, and the entry of the moisture from the ambient atmosphere or the dissipation of moisture into the ambient atmosphere can be well shielded.

The aforesaid film preferably has an oxygen permeability of not more than 35 ml/m$^2$.24 hr.atm. ($O^2$ partial pressure), and a moisture permeability of not more than 1 g/m$^2$.24 hr.

The oxygen permeability is measured by a pressure method at 27° C., and the moisture permeability is measured at a temperature of 40° C. and a relative humidity of 90%.

Only a limited range of materials are available as the film having the above-specified oxygen permeability and moisture permeability. Examples include an aluminum foil, an aluminum vacuum-deposited film, or a laminate film containing such a foil or film as one component. The laminate film is, for example, a polyester/aluminum foil/polyolefin laminate, or a paper/aluminum foil/polyester/polyethylene laminate.

The structures of this invention covered with such a film are brought into contact with the ambient atmosphere by removing or breaking the film prior to use, whereupon they exhibit good oxygen scavenging ability or heat-generating ability.

The oxygen scavenger composition of this invention are inexpensive and sanitary without the generation of corrosive gases. In addition, they inherently possess very good ability to scavenge or capture oxygen. They are suitable for producing easily and conveniently an oxygen-free atmosphere or an atmosphere containing a much reduced amount of oxygen. Accordingly, they find a wide range of applications, and for example, they are recommended for use in the following applications.

(i) Antioxidation of oils and fats or materials containing oils and fats:

For the prevention of oxidative degradation of "instant" noodles, fried dough cakes, peanuts, butter-fried peanuts, fried beans, popcorns, potato chips, chocolates, feeds for eels in aquaculture, fried rice crackers, flakes of dried bonito, rice bran, powdered milk, refined rice, dairy products, wheat germs, confectionery, god foods, etc.

(ii) Prevention of degradation of the flavor and tastes of foods:

For the prevention of the oxidative degradation involving deterioration in color, flavor and taste of foods such as bread crumbs, dried vegetables, dried seafoods, dried seaweeds, dried mushrooms, smoked foods, dried fruits, laver, coffee beans, black teas, and green teas.

(iii) Antiseptic, moth-proofing, antibacterial and moldproof applications:

For the prevention of degeneration and spoilage by molds, bacteria or moths of bread, rice cake, Japanese unbaked cakes, various fresh raw foods such as vegetables, fruits, fish beef, pork and fowl, and books.

(iv) Prevention of degeneration of various organic materials:

For the prevention of the oxidative degeneration and discoloration of pharmaceuticals, wearing apparel, films, and plastics.

(v) Rust-proofing of metals:

For rust-proofing of metallic products such as iron, zinc, copper and aluminum products, and electric appliances, component parts, household applications, musical instruments and precision machines using such metals.

(vi) Detection of oxygen:
A base material for an oxygen leakage detector.

The heat-generating composition of this invention can perform controlled heat generation as stated hereinabove. Accordingly, they can be used at relatively low temperatures in contact with a part of the human body for the warming and cold-proofing of the human body. Furthermore, they can be used at relatively high temperatures to warm coffee, milk, etc. They are expected, therefore, to find a very wide range of applications. Particularly, the following applications are recommended.

The following Examples illustrate the present invention in more detail.

EXAMPLE 1

Each of various iron powders (a) (having a particle diameter of less than 150 microns), silicic acid (b), and optionally the metal halide (c) and the filler (d) shown in Table 1 were fully pulverized and mixed in an agate mortar under a nitrogen atmosphere. The resulting composition was exposed to an oxygen atmosphere at 1 atmosphere at 20° C., and the amount of oxygen absorbed by the composition was measured. The types and amounts of the constituents, and the results of measurement are shown in Table I.

For comparison, the results obtained without using silicic acid (b) or iron powder (a) are also shown.

TABLE I

| Run No. | Metallic iron (a) | (g) | Oxidation promoter (b) | (g) | Oxidation promoter aid (c) | (g) | Filler | (g) | Exposure time (hr) | Amount of oxygen absorbed (cc) |
|---|---|---|---|---|---|---|---|---|---|---|
| I-1 | iron sponge | (0.5) | ortho-silicic acid | (0.5) | — | | — | | 66 | 84 |
| I-2 | " | (0.5) | " | (0.5) | NaCl | (0.5) | — | | 66 | 123 |
| I-3 | " | (0.5) | " | (1.5) | " | (0.5) | — | | 66 | 132 |
| I-4 | " | (0.5) | " | (0.5) | " | (0.5) | acid terra alba | (0.5) | 66 | 121 |
| I-5 | cast iron | (0.5) | meta-silicic acid | (0.5) | — | | — | | 18 | 41 |
| I-6 | " | (0.5) | " | (0.5) | — | | $CaSO_4 \cdot 2H_2O$ | (0.5) | 18 | 54 |
| I-7 | " | (0.5) | " | (0.5) | NaCl | (0.5) | — | | 19 | 72 |
| I-8 | " | (0.5) | " | (0.5) | " | (0.5) | Zeolite H type | (0.5) | 21 | 144 |
| I-9 | iron sponge | (0.5) | " | (0.5) | " | (0.5) | — | | 23 | 28 |
| I-10 | " | (0.5) | " | (0.5) | " | (0.5) | diatomaeous earth | (0.5) | 23 | 36 |
| I-11 | " | (0.5) | " | (0.5) | " | (0.5) | acid terra alba | (0.5) | 23 | 73 |
| I-12 | " | (0.5) | " | (0.5) | " | (0.5) | talc | (0.5) | 23 | 53 |
| I-13 | " | (0.5) | " | (0.5) | " | (0.5) | ferric oxide | (0.5) | 19 | 67 |
| I-14 | " | (0.5) | " | (0.5) | " | (0.5) | asbestos | (0.5) | 19 | 70 |
| I-15 | " | (0.5) | " | (0.5) | " | (0.5) | kaolin | (0.5) | 19 | 63 |
| I-16 | " | (0.5) | " | (1.5) | " | (0.5) | acid terra alba | (0.5) | 66 | 124 |
| I-17 | " | (0.5) | " | (0.5) | " | (0.1) | acid terra alba | (0.5) | 19 | 37 |
| I-18 | " | (0.5) | " | (0.5) | " | (0.5) | acid terra alba | (0.5) | 19 | 30 |
| I-19 | " | (0.5) | " | (0.5) | " | (0.5) | calcium sulfate | | 18 | 34 |
| I-20 | " | (0.5) | " | (0.5) | " | (0.5) | aluminum hydroxide | (0.5) | 18 | 43 |
| I-21 | " | (0.5) | " | (0.5) | KBr | (0.5) | acid terra alba | (0.5) | 18 | 58 |
| I-22 | " | (0.5) | " | (0.5) | $BaCl_2 \cdot 2H_2O$ | (0.5) | acid terra alba | (0.5) | 18 | 45 |
| I-23 (control) | " | (0.5) | — | | — | | — | | 20 | 0 |
| I-24 (control) | " | (0.5) | — | | NaCl | (0.5) | — | | 20 | 0 |
| I-25 | — | | meta-silicic acid | (0.5) | — | | — | | 23 | 0 |

(vii) Utilization as a heater:
Body warming materials such as a portable abdomen-warming heater; therapeutic materials such as warm pack; heating or warming of drinks such as liquors, coffee and milk; heating of packed foods such as canned foods; thawing of frozen foods; heat-diffusion of perfumes, moth-proofing agents, insecticides, and fungicides; cold-proofing materials; heat insulation; anti-freezing agents for mats and windowpanes; and portable heaters.

EXAMPLE II 0.5 g of cast iron powder having a particle diameter of less than 150 microns, a sodium silicate hydrate and optionally a metal halide and a filler were fully mixed and pulverized in an agate mortar under a nitrogen atmosphere. The resulting composition was exposed to an oxygen atmosphere at 1 atm. and 200° C., and the amount of oxygen absorbed by the composition was measured. The types and amount of the components, and the results of measurement are shown in Table II.

TABLE II

| Run No. | Metallic iron (a) | (g) | Oxidation promoter (b) | (g) | Oxidation promoter aid (c) | (g) | Filler | (g) | Exposure time (hr) | Amount of oxygen absorbed (cc) |
|---|---|---|---|---|---|---|---|---|---|---|
| II-1 | cast iron powder | (0.5) | Na$_2$SiO$_3$ . 5H$_2$O | (0.5) | — | | CaSO$_4$ . 2H$_2$O | (0.5) | 19 | 82 |
| II-2 | cast iron powder | (0.5) | " | (0.5) | NaCl | (0.5) | " | (0.5) | 19 | 125 |
| II-3 | cast iron powder | (0.5) | " | (0.5) | " | (0.5) | terephthalic acid | (0.5) | 18 | 129 |
| II-4 | cast iron powder | (0.5) | " | (0.5) | KBr | (0.5) | CaSO$_4$ . 2H$_2$O | (0.5) | 21 | 126 |
| II-5 | cast iron powder | (0.5) | " | (0.5) | CaCl$_2$ | (0.5) | " | (0.5) | 21 | 66 |
| II-6 | cast iron powder | (0.5) | Na$_2$SiO$_3$ . 9H$_2$O | (0.4) | — | | " | (1.1) | 21 | 103 |
| II-7 | cast iron powder | (0.5) | " | (0.5) | NaCl | (0.5) | " | (0.5) | 21 | 121 |
| II-8 | cast iron powder | (0.5) | " | (0.5) | " | (0.5) | zeolite H-type | (0.5) | 22 | 111 |
| II-9 | cast iron powder | (0.5) | " | (0.5) | " | (0.5) | diatomaceous earth | (0.5) | 20 | 90 |
| II-10 | cast iron powder | (0.5) | " | (0.5) | " | (0.5) | bentonite | (0.5) | 20 | 65 |
| II-11 | cast iron powder | (0.5) | " | (0.5) | " | (0.5) | silica gel | (0.5) | 21 | 91 |
| II-12 | cast iron powder | (0.5) | " | (0.5) | " | (0.5) | CaSO$_4$ | (0.5) | 21 | 149 |
| II-13 | cast iron powder | (0.5) | " | (0.5) | " | (0.5) | CaSO$_4$ . ½H$_2$O | (0.5) | 21 | 153 |
| II-14 | cast iron powder | (0.5) | " | (0.5) | " | (0.5) | acid terra alba | (0.5) | 16 | 93 |
| II-15 | cast iron powder | (0.5) | " | (0.5) | " | (0.5) | CaSO$_4$ . 2H$_2$O | (0.5) | 16 | 122 |
| II-16 | cast iron powder | (1.76) | " | (0.1) | " | (0.04) | " | (0.1) | 7 | 30 |
| II-17 | cast iron powder | (0.2) | " | (0.4) | " | (0.2) | " | (1.2) | 21 | 49 |
| II-18 | cast iron powder | (0.1) | " | (0.4) | " | (0.3) | " | (1.2) | 21 | 21 |
| II-19 | cast iron powder | (1.4) | " | (0.2) | " | (0.1) | " | (0.3) | 21 | 94 |
| II-20 | cast iron powder | (0.5) | " | (0.2) | " | (0.1) | " | (0.2) | 40 | 71 |
| II-21 | cast iron powder | (0.5) | meta-silicic acid / Na$_2$SiO$_3$ . 9H$_2$O | (0.25) / (0.25) | " | (0.5) | — | | 22 | 73 |
| II-22 | cast iron powder | (0.5) | meta-silicic acid / Na$_2$SiO$_3$ . 9H$_2$O | (0.25) / (0.25) | " | (0.5) | CaSO$_4$ . 2H$_2$O | (0.5) | 22 | 99 |
| II-23 | cast iron powder | (0.5) | meta-silicic acid / Na$_2$SiO$_3$ . 9H$_2$O | (0.25) / (0.25) | " | (0.1) | acid terra alba | 0.5 | 22 | 103 |
| II-24 | cast iron powder | (0.5) | meta-silicic acid / Na$_2$SiO$_3$ . 9H$_2$O | (0.25) / (0.25) | " | (0.5) | Fe$_2$O$_3$ | 0.5 | 22 | 95 |
| II-25 | cast iron powder | (0.5) | meta-silicic acid / Na$_2$SiO$_3$ . 5H$_2$O | (0.2) / (0.4) | " | (0.2) | active carbon / CaSO$_4$ . 2H$_2$O | (0.05) / (0.8) | 64 | 125 |
| II-26 (control) | cast iron powder | (0.5) | MgSiO$_3$ | (0.5) | " | (0.5) | CaSO$_4$ . 2H$_2$O | (0.5) | 21 | 0 |
| II-27 (control) | cast iron powder | (0.5) | CaSiO$_3$ | (0.5) | " | (0.5) | " | (0.5) | 21 | 0 |

EXAMPLE III

Cast iron powder having a particle diameter of less than 150 microns, sodium meta-borate nonahydrate, sodium chloride, each of the various fillers shown in Table III and active carbon were fully mixed and pulverized in an agate mortar under a nitrogen atmosphere. The resulting composition was exposed to an oxygen atmosphere at 1 atmosphere and 25° C. The latent period which lasted until the amount of oxygen absorbed became 5 cc, and the amount of oxygen absorbed by the composition after the latent period were measured. The types and amounts of the constituents, the latent period and the amount of oxygen absorbed are shown in Table III.

In Table III, the latent period is expressed by the time (hours) which lasted until 5 cc of oxygen was absorbed. The exposure time represents the time during which the composition was exposed to the oxygen atmosphere after the latent period. The amount of oxygen absorbed excludes 5 cc of oxygen absorbed during the latent period.

TABLE III

| Run No. | Metallic iron (a) | (g) | Na₂SiO₃ . 9H₂O (g) | NaCl (g) | Filler | (g) | Active carbon (g) | Latent period (hr) | Exposure time (hr) | Amount of oxygen absorbed (cc) |
|---|---|---|---|---|---|---|---|---|---|---|
| III-1 | cast iron powder | | 0.5 | 0.5 | CaSO₄ . 2H₂O | (0.5) | 0.1 | 12 | 89 | 115 |
| III-2 | cast iron powder | (0.5) | 0.5 | 0.5 | " | (0.5) | 0.01 | 0.1 | 14.5 | 128 |
| III-3 | cast iron powder | (0.5) | 0.5 | 0.5 | " | (0.5) | 0.2 | 23 | 42 | 81 |
| III-4 | cast iron powder | (0.5) | 0.5 | 0.5 | " | (0.5) | 0.04 | 2.4 | 21 | 133 |
| III-5 | cast iron powder | (0.5) | 0.4 | 0.1 | " | (1) | 0.1 | 3 | 21 | 133 |
| III-6 | cast iron powder | (0.5) | 0.4 | — | " | (1) | 0.1 | 5 | 21 | 56 |
| III-7 | cast iron powder | (0.5) | 0.4 | — | " | (1) | 0.05 | 1.1 | 21 | 103 |
| III-8 | cast iron powder | (0.5) | 0.5 | 0.5 | acid terra alba | (0.5) | 0.01 | 0.2 | 21 | 96 |
| III-9 | cast iron powder | (0.5) | 0.5 | 0.5 | acid terra alba | (0.5) | 0.03 | 1 | 40 | 92 |
| III-10 | cast iron powder | (0.5) | 0.5 | 0.5 | CaSO₄ . 2H₂O | (0.5) | — | 0 | 19 | 125 |
| III-11 | cast iron powder | (0.5) | 0.5 | — | " | (0.5) | — | 0 | 19 | 82 |
| III-12 | cast iron powder | (0.5) | 0.5 | 0.5 | acid terra alba | (0.5) | — | 0 | 16 | 93 |

EXAMPLE IV

Each of the various iron powder having a particle diameter of less than 150 microns, sodium alum and optionally a metal halide and a filler were mixed and pulverized fully in an agate mortar under a nitrogen atmosphere. The resulting composition was exposed to an oxygen atmosphere at 1 atmosphere and 20° C., and the amount of oxygen absorbed by the composition was measured. The types and amounts of the constituents, and the results of measurement are shown in Table IV.

EXAMPLE V 0.5 g of cast iron powder having a particle diameter of less than 150 microns, a sodium borate hydrate, a metal halide and a filler were fully mixed and pulverized in an agate mortar under a nitrogen atmosphere. The composition obtained was exposed to an oxygen atmosphere at 1 atmosphere and 20° C., and the amount of oxygen absorbed by the composition was measured. The types and amounts of the constituents, and the results of measurement are shown in Table V.

TABLE IV

| Run No. | Metallic iron (a) | (g) | Oxidation promoter (b) (sodium alum) (g) | Oxidation promoter aid (c) | (g) | Filler | (g) | Exposure time (hr) | Amount of oxygen absorbed (cc) |
|---|---|---|---|---|---|---|---|---|---|
| IV-1 | iron sponge | (0.5) | 0.5 | — | | — | | 70 | 25 |
| IV-2 | " | (0.5) | 0.5 | NaCl | (0.5) | — | | 70 | 48 |
| IV-3 | " | (0.5) | 1.5 | " | (0.5) | acid terra alba acid terra alba | (0.5) (0.5) | 94 | 75 |
| IV-4 | " | (0.5) | 0.5 | " | (0.5) | Fe₂O₃ | (0.5) | 22 | 23 |
| IV-5 | " | (0.5) | 0.5 | " | (0.5) | diatomaceous earth | (0.5) | 89 | 24 |
| IV-6 | " | (0.5) | 1.5 | " | (1.0) | asbestos | (0.5) | 18 | 22 |
| IV-7 | " | (0.5) | 1.5 | — | | acid terra alba | (0.5) | 18 | 12 |
| IV-8 | " | (0.5) | 0.5 | KBr | (0.5) | — | | 20 | 47 |
| IV-9 | " | (0.5) | 0.5 | BaCl₂.2H₂O | (0.5) | — | | 20 | 34 |
| IV-10 | cast iron powder | (0.5) | 1.5 | KBr | (0.5) | — | | 27 | 128 |
| IV-11 | cast iron powder | (0.5) | 1.0 | NaCl | (1.0) | — | | 20 | 88 |

TABLE V

| Run No. | Metallic iron (a) (g) | Oxidation promoter (b) | (g) | Oxidation promoter aid (c) | (g) | Filler | (g) | Exposure time (hr) | Amount of oxygen absorbed (cc) |
|---|---|---|---|---|---|---|---|---|---|
| V-1 | 0.5 | NaBO₂ . 4H₂O | (0.5) | NaCl | (0.5) | CaSO₄ . 2H₂O | (0.5) | 20 | 71 |
| V-2 | 0.5 | " | (1.0) | " | (0.5) | acid terra alba | (0.5) | 30 | 71 |
| V-3 | 0.5 | Na₂B₄O₇ . 10H₂O | (0.5) | " | (0.5) | " | (0.5) | 20 | 30 |
| V-4 | 0.5 | NaBO₃ . 4H₂O | (0.5) | " | (0.5) | CaSO₄ . 2H₂O | (0.5) | 21 | 11 |

EXAMPLE VI-(1)

Iron powder (30 g), 12 g of meta-silicic acid, 9 g of sodium silicate nonahydrate, 3 g of acid terra alba, 3 g of sodium chloride and 3 g of active carbon were fully mixed in a mortar under a nitrogen atmosphere to prepare a heat-generating composition.

Nine circular pores having a diameter of 4 mm were provided in a 100 micron-thick polyethylene film having a size of 9 cm×9 cm. The perforated polyethylene film and a non-woven cloth composed of polyester, nylon and polypropylene were pressed under heat to prepare an air-permeable material having a thickness of 250 microns and an oxygen permeability of 0.55 cc/cm$^2$. min. 1 atm.

A bag, 9 cm×9 cm in size, was made from the air-permeable material, and the above heat-generating composition was placed into the bag under a nitrogen atmosphere to form a sheet-like heat-generating structure.

The heat-generating structure was taken out into the air, and placed on a sheet of tissue paper having a thickness of about 5 mm with its air-permeable surface facing upward. A thermometer was brought into intimate contact with the undersurface of the heat-generating structure, and the rise of temperature was measured. The room temperature was 16° to 18° C., and the surface of the heat-generating structure attained each of the temperature indicated in Table VI-A. Temperatures of more than 50° C. could be maintained for about 10 hours.

TABLE VI-A

| Time elapsed (hours) | Surface temperature (°C.) |
|---|---|
| 1 | 54 |
| 2 | 60 |
| 4 | 61 |
| 6 | 62 |
| 8 | 62 |
| 10 | 54 |
| 11 | 43 |

EXAMPLE VI-(2)

Iron powder (30 g), 18 g of meta-silicic acid, 3 g of sodium silicate nonahydrate, 3 g of acid terra alba, 3 g of sodium chloride and 3 g of active carbon were fully mixed in a mortar under a nitrogen atmosphere to prepare a heat-genertng composition.

A sheet-like heat-generating structure was made in the same way as in Example V-(1) using the resulting heat-generating composition, and the temperature attained by heat generation was measured. The results are shown in Table VI-B.

EXAMPLE VI-(3)

Iron powder (33.3 g), 13.3 g of meta-silicic acid, 10 g of sodium silicate nonahydrate, and 3.4 g of sodium chloride were fully mixed in a mortar under a nitrogen atmosphere to prepare a heat-generating composition.

A sheet-like heat-generating structure was made in the same way as in Example V-(1) using the heat-generating composition, and the temperature attained by heat generation was measured. The results are shown in Table VI-B.

EXAMPLE VI-(4)

Iron powder (30 g), 3 g of meta-silicic acid, 18 g of sodium silicate nonahydrate, 3 g of acid terra alba, 3 g of sodium chloride and 3 g of activated carbon were fully mixed in a mortar under a nitrogen atmosphere to prepare a heat-generating composition.

A sheet-like heat-generating structure was made in the same way as in Example 1 using the heat-generating composition, and the temperature attained by heat generation was measured. The results are shown in Table VI-B.

EXAMPLE VI-(5)

Cast iron powder (15.4 g), 12.3 g of sodium meta-silicate nonahydrate, 6.2 g of sodium chloride, 24.6 g of calcium sulfate dihydrate, 1.5 g of active carbon (60 g in total) were fully mixed in a mortar under a nitrogen atmosphere to prepare a heat-generating composition. A sheet-like heat-generating structure was produced in the same way as in Example VI-(1) using the heat-generating composition, and the temperature attained by heat generation was measured.

The results are shown in Table VI-B.

TABLE VI-B

| Example | Temperature attained (°C.) | Duration of temperature maintenance |
|---|---|---|
| VI-(2) | 64 | More than 50° C. for 7 hours |
| VI-(3) | 47 | More than 40° C. for 6 hours |
| VI-(4) | 46 | More than 40° C. for 2 hours |
| VI-(5) | 50 | More than 40° C. for 4 hours |

EXAMPLE VII

Cast iron powder (10 g), 8 g of sodium metasilicate nonahydrate, 4 g of sodium chloride, 16 g of calcium sulfate dihydrate (the above four ingredients had an average particle diameter of about 150 microns), and 1 g of activated carbon were mixed under a nitrogen atmosphere for 20 minutes in a glass V-type blender having a capacity of about 150 ml. Three grams of the mixture was weighed in an atmosphere of nitrogen, and put into a bag, 5 cm×5 cm in size, made of a packaging film composed of a laminate of a perforated polyethylene film having an oxygen permeability of about 0.2 ml/cm$^2$. min. atm. and a sheet of Japanese paper.

One bag of the resulting oxygen absorbing agent was put into a bag, 18 cm×27 cm, containing a nitrogen atmosphere and made by a gas-barrier film (EGN film which is a special laminate film composed of nylon-/ethylene-vinyl alcohol copolymer/polyethylene, made by Toyo Seikan Kaisha Limited).

Then, 10 g of bread, 40 g of unboiled Chinese noodles, 50 g of rice cake, 40 g of sponge cake and 20 g of "kamaboko" (boiled fish paste) were put respectively into five such bags (18 cm×27 cm) into which the oxygen absorbing agent had been put under a nitrogen atmosphere, and the bags were sealed. Then, 500 ml of air was injected into each of these bags by means of an injection syringe, and the bags were again sealed. They were allowed to stand at 25° C., and the state of occurrence of mold, or the change of color was observed. The results are shown in Table VII.

For comparison, the above procedure was repeated except that the oxygen absorbing agent was not used. Thus, the state of occurrence of mold or the change of color in bread, unboiled Chinese noodles, rice cake, sponge cake, and "kamaboko" in the gas-barrier bags were observed. The results are shown in Table VII in the rows headed "Comparison".

sphere of the bag, the state of occurrence of molds, color and luster were examined. The taste and flavor of the bonito was also examined.

For comparison, the above procedure was repeated except that the oxygen absorbing agent was not used. The results are shown in Table VIII.

TABLE VIII

|  |  | Time elapsed | 1 day | 1 week | 2 weeks | 3 weeks | 4 weeks | 5 weeks |
|---|---|---|---|---|---|---|---|---|
| Example VIII | | Oxygen concentration (%) | 0.00 | 0.00 | 0.00 | 0.00 | 0.00 | 0.00 |
| | | Occurrence of mold | None | None | None | None | None | None |
| | | Color | Pink red | Pink red | Pink red | Pink red | Pink red | Pink red |
| | | Luster | Yes | Yes | Yes | Yes | Yes | Yes |
| | | Flavor | — | Good | — | Good | — | Good |
| | | Taste | — | Good | — | Good | — | Good |
| Comparison | | Oxygen concentration (%) | 20.8 | 19.0 | — | 18.0 | — | 16.5 |
| | | Occurrence of mold | None | None | None | None | None | None |
| | | Color | Pink red | Brown to reddish brown | Brown with a yellowish tint all over | Brown with a yellowish tint all over | Brown with a yellowish tint all over | Brown with a yellowish tint all over |
| | | Luster | Yes | Slightly light | Almost none | No | No | No |
| | | Flavor | — | Slightly oily smell | Oily smell | Oily smell | — | Oily smell |
| | | Taste | — | Almost unchanged | — | Like wooden sawdust | — | Like wooden sawdust |

TABLE VII

| Example | Food | Oxygen absorbing agent | Number of days that elapsed |  |  |  |  |  |  |
|---|---|---|---|---|---|---|---|---|---|
| | | | 0 | 3 | 5 | 10 | 15 | 20 | 30 |
| VII-1 | Bread | Yes | — | — | — | — | — | — | — |
| Comparison | | No | — | + | ++ | ++ | +++ | +++ | +++ |
| VII-2 | Unboiled Chinese noodles | Yes | — | — | — | — | — | — | — |
| Comparison | | No | — | — | + | + | ++ | +++ | ++++ |
| VII-3 | Rice cake | Yes | — | — | — | — | — | — | + |
| Comparison | | No | — | — | — | + | ++ | ++ | +++ |
| VII-4 | Sponge cake | Yes | — | — | — | — | — | — | — |
| Comparison | | No | — | — | ++ | +++ | ++++ | ++++ | ++++ |
| VII-5 | "Kamaboko" | Yes | White | White | White | White | White | White | White |
| Comparison | | No | White | White | Yellow | Yellow | Yellow | Yellow | Yellow |

The occurrence of mold was evaluated on the following scale.
- —: Mold colonies not observed.
- +: Mold colonies occurred partly.
- ++: Mold colonies occurred to some extent.
- +++: Many mold colonies occurred.
- ++++: Mold colonies spread throughout the food.

EXAMPLE VIII

A bag having a spatial volume of about 1300 ml made of a gas barrier film (EGN film, a product of Toyo Seikan Kasisha Limited) was filled with 30 g of flakes of dried bonito (moisture content 14%) and 5.25 g of an oxygen absorbing agent (1.25 g of iron powder, 1.25 g of sodium meta-silicate nonahydrate, 1.25 g of sodium chloride, 1.25 g of calcium sulfate dihydrate and 0.25 g of active carbon wrapped by an air-permeable non-woven fabric), and then sealed. The bonito flakes were thus stored at 30° C. in the bag, and the changes with time of the oxygen concentration of the inside atmosphere of the bag, the state of occurrence of molds, color and luster were examined. The taste and flavor of the bonito was also examined.

EXAMPLE IX

One hundred grams of small dry boiled sardines and 4 g of an oxygen absorbing agent (consisting of 1 g of iron powder, 1.0 g of sodium meta-silicate nonahydrate, 1.0 g of sodium chloride, 1.0 g of calcium sulfate dihydrate and 0.10 g of active carbon wrapped by an air-permeable non-woven cloth) were placed in a bag having a volume of 800 cc and made of a three-layer film of nylon/ethylene-vinyl alcohol copolymer/polyethylene (EGN, a trademark for a product of Toyo Seikan Kaisha Limited; oxygen permeability 6 ml/m$^2$.24 hrs. atm.), and stored at 30° C.

The concentration of oxygen in the bag was 21% initially, but in about 10 hours, decreased to 0.7 cc/g of sardines.

When 20 hours elapsed further, oxygen was substantially absent in the bag. The bag was allowed to stand for one month in this condition. When the flavor of dry sardines was organoreptically tested by five panelists, all of them reported that the taste and flavor of the sardines were good.

For comparison, the above experiment was carried out without using the oxygen absorbing agent. On the 10th day, browing apparently occurred in the dry sardines, and they gave an oil-like smell. On the 17th day, the sardines became dark brown and began to be swollen, giving off an oil-like unplesant smell.

EXAMPLE X

Iron sponge (6 g), 6 g of meta-silicic acid, 6 g of sodium chloride and 6 g of acid terra alba were fully mixed and pulverized in a mortar under an atmosphere of nitrogen. Two grams of the mixture was weighed under a nitrogen atmosphere, and placed in a bag, 5 cm × 5 cm, made of an air-permeable non-woven fabric composed of nylon, polyester and polypropylene to prepare and oxygen absorbing agent.

Red flour beetles (Tribolium Confusum J. du V.) habitating cereal grains were caught. Twelve to twenty-five such beetles and rice bran were placed into each of eight glass bottles having a volume of about 250 ml.

Five such glass bottles were chosen at random. One bag of the aforesaid oxygen absorbing agent was placed in each of the chosen bottles, and the bottles were stopped up. The survival of the beetles in the eight bottles was observed periodically. The results are shown in Table X below. The experiment was conducted at 20° C.

TABLE X

| Bottle No. | Example | | | | | Comparison | | |
|---|---|---|---|---|---|---|---|---|
| | 1 | 2 | 3 | 4 | 5 | 1 | 2 | 3 |
| Presence of the oxygen absorbing agent | Yes | | | | | No | | |
| Time elapsed (hours) | | | | | | | | |
| 0 | 12 | 14 | 20 | 15 | 25 | 15 | 14 | 19 |
| 3 | 12 | 14 | 20 | 15 | 25 | 15 | 14 | 19 |
| 6 | 12 | 14 | 20 | 5 | 25 | 15 | 14 | 19 |
| 7 | 9 | 5 | 19 | 0 | 13 | 15 | 14 | 19 |
| 9 | 0 | 0 | 0 | 0 | 0 | 15 | 14 | 19 |
| 36 | 0 | 0 | 0 | 0 | 0 | 15 | 14 | 19 |

The numerals in the table show the number of beetles which survived in the bottles.

EXAMPLE XI

Cast iron powder (10 parts), 10 parts of sodium metasilicate nonahydrate, 10 parts of sodium chloride and 10 parts of calcium sulfate dihydrate (all of the above ingredients had an average particle diameter of less than 150 microns) were mixed under a nitrogen atmosphere for 20 minutes in a V-type blender having a capacity of 150 volumes. Two grams of the mixture was weighed under a nitrogen atmosphere, and placed in a bag, 5 cm × 5 cm, made of a laminate of a perforated polyethylene sheet having an air permeability of about 0.2 ml/cm$^2$. min. atm. and a sheet of Japanese paper, followed by sealing the bag.

The bag was put into a bag, 7 cm × 7 cm in size, made of an oxygen-impermeable moisture-impermeable four-layer laminate film composed of polyester, polyethtylene, aluminum foil and polyethylene under a nitrogen atmosphere, and allowed to stand for a predetermined period of time in an atmosphere at 30°–37° C. Then, the outer bag was broken and the inner bag containing oxygen absorbing agent was put in an atmosphere of pure oxygen at 30° C. and the amount of oxygen absorbed was measured. The results are shown in Table XI.

For comparison, the above procedure was repeated except that the above gas-barrier laminate film was replaced by a cellophane-polyethylene laminate film having an oxygen permeability of 35 ml/m$^2$. 24 hrs. atom. (27° C., determined by the pressure method) and a moisture permeability of 7 g/m$^2$. 24 hrs. (determined at 40° C. and 90% RH).

The results are also shown in Table XI.

TABLE XI

| Standing period in the dryer (days) | Polyester-polyethylene-aluminum foil-polyethylene laminate film | | Cellophane-polyethylene laminate film | |
|---|---|---|---|---|
| | Oxygen absorbed | | Oxygen absorbed | |
| | Duration (hours) | Amount (ml.) | Duration (hours) | Amount (ml.) |
| 0 | 21 | 112 | 21 | 109 |
| 14 | 21 | 111 | 21 | 109 |
| 28 | 21 | 115 | 21 | 101 |
| 70 | 21 | 112 | 21 | 65 |

What we claim is:

1. An oxygen scavenger composition consisting essentially of
   (a) metallic iron, and
   (b) at least one oxidation promoter selected from the group consisting of sodium silicate hydrates, silicic acid, sodium alum and sodium borate hydrates, and optionally
   (c) at least one oxidation promoter aid which is a metal halide compound, and/or
   (d) a water-insoluble or sparingly water-soluble inert filler.

2. The oxygen scavenger composition of claim 1 which consists essentially of the metallic iron (a), the oxidation promoter (b), and the oxidation promoter aid (c).

3. The oxygen scavenger composition of claim 1 which consists essentially of the metallic iron (a), the oxidation promoter (b), the oxidation promoter aid (c), and the filler (d).

4. The oxygen scavenger composition of any one of claim 1 to 3 wherein the oxidation promoter (b) is a sodium silicate hydrate or silicic acid.

5. The oxygen scavenger composition of any one of claim 1 to 3 wherein the oxidation promoter aid (c) is a chloride or bromide of an alkali metal or alkaline earth metal.

6. The oxygen scavenger composition of claim 5 wherein the oxidation promoter aid (c) is sodium chloride, potassium chloride, magnesium chloride, sodium bromide or potassium bromide.

7. The oxygen scavenger composition of claim 1 wherein the amount of the metallic iron (a) is 5 to 90% by weight based on the entire composition.

8. The oxygen scavenger composition of claim 1 wherein the amount of the metallic iron (a) is 10 to 80% by weight based on the entire composition.

9. The oxygen scavenger composition of claim 2 wherein the amount of the metallic iron (a) is 5 to 90% by weight based on the entire composition, and the amounts of the oxidation promoter (b) and the oxidation promoter aid (c) are each at least 3 parts by weight per 100 parts by weight of the metallic iron (a).

10. The oxygen scanvenger composition of claim 3 wherein the amount of the metallic iron (a) is 5 to 90% by weight based on the entire composition, and the amounts of the oxidation promoter (b), the oxidation promoter aid (c) and the filler (d) are each at least 3 parts by weight per 100 parts by weight of the metallic iron (a).

11. A heat-generating composition having an initial rate of oxygen scavenging of at least 5 ml per gram of said composition in the air at 20° C. during a period of one hour after the oxidation reaction has substantially begun, said composition consisting substantially of
(a) metallic iron,
(b) a sodium silicate hydrate, and/or silicic acid as an oxidation promoter, and
(c) at least one oxidation promoter aid which is a metal halide compound, and optionally
(d) a water-insoluble or sparingly water-soluble inert filler.

12. The heat-generaing composition of claim 11 which has an initial rate of oxygen scavening of at least 10 ml per gram of said composition in the air at 20° C. during a period of one hour after the oxidation reaction has substantially begun.

13. The heat-generating composition of claim 11 which consists of 20 to 80% by weight of the metallic iron (a), 10 to 50% by weight of sodium meta-silicate nonahydrate and meta-silicic acid (b), and 1 to 20% by weight of sodium chloride (c) and optionally not more than 50% by weight of the filler (d).

14. A deoxygenating structure comprising the oxygen scavenger composition of claim 1 and a film having an oxygen permeability of at least 0.005 ml/cm$^2$. min. atm. ($O_2$ partial pressure) covering said composition.

15. The deoxygenating structure of claim 14 wherein said covering film has an oxygen permeability of 0.01 to 20 ml/cm$^2$. min. atm. ($O_2$ partial pressure).

16. A heat-generating structure comprising the heat-generating composition of claim 11 and a film having an oxygen permeability of 0.4 to 10 ml/cm$^2$. min. atm. ($O_2$ partial pressure) covering said composition.

* * * * *